US007536999B2

(12) United States Patent
Ootake et al.

(10) Patent No.: US 7,536,999 B2
(45) Date of Patent: May 26, 2009

(54) AIR-FUEL RATIO CONTROL APPARATUS

(75) Inventors: Yoshiyuki Ootake, Yokohama (JP); Yasuji Ishizuka, Chigasaki (JP); Masaki Koga, Yokohama (JP); Kenichi Sato, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 4 days.

(21) Appl. No.: 11/961,075

(22) Filed: Dec. 20, 2007

(65) Prior Publication Data

US 2008/0172167 A1 Jul. 17, 2008

(30) Foreign Application Priority Data

Jan. 12, 2007 (JP) ............................ 2007-004552
Dec. 7, 2007 (JP) ............................ 2007-316748

(51) Int. Cl.
*F02M 25/07* (2006.01)
*B60T 7/12* (2006.01)

(52) U.S. Cl. ..................... 123/568.21; 701/108; 60/299

(58) Field of Classification Search ............ 123/568.14, 123/568.15, 568.21, 568.22, 568.23, 568.24; 701/101, 103, 108
See application file for complete search history.

(56) References Cited

U.S. PATENT DOCUMENTS

| | | | | |
|---|---|---|---|---|
| 5,832,724 | A * | 11/1998 | Watanabe et al. | 60/276 |
| 6,748,919 | B2 * | 6/2004 | Abo et al. | 123/299 |
| 2004/0144084 | A1 * | 7/2004 | Hara | 60/288 |
| 2007/0214775 | A1 * | 9/2007 | I et al. | 60/288 |
| 2008/0098722 | A1 * | 5/2008 | Yasuda et al. | 60/274 |
| 2008/0172166 | A1 * | 7/2008 | Nagai et al. | 701/103 |

FOREIGN PATENT DOCUMENTS

JP H05-321644 A 12/1993

* cited by examiner

*Primary Examiner*—John T Kwon
(74) *Attorney, Agent, or Firm*—Global IP Counselors, LLP

(57) ABSTRACT

An air-fuel ratio control apparatus is basically provided with an exhaust system, a first sensor and a controller. The exhaust system includes an exhaust channel with a main catalytic converter disposed therein, a bypass channel with a bypass catalytic converter disposed therein, and a valve mechanism disposed in the exhaust channel between the connection points of the exhaust channel to switch a pathway for exhaust gas from the exhaust channel to the bypass channel. The first sensor detects a property indicative of an air-fuel ratio of exhaust flowing in the exhaust channel at a point downstream of the valve mechanism. The controller adjusts an element temperature of the first sensor to a prescribed temperature or less during a prescribed interval of time from when the valve mechanism is switched from a closed state to an open state.

20 Claims, 9 Drawing Sheets

AIR-FUEL RATIO CONTROL APPARATUS

CROSS-REFERENCE TO RELATED APPLICATIONS

This application claims priority to Japanese Patent Application Nos. 2007-004552, filed on Jan. 12, 2007 and 2007-316748, filed on Dec. 7, 2007. The entire disclosures of Japanese Patent Application Nos. 2007-004552 and 2007-316748 are hereby incorporated herein by reference.

BACKGROUND OF THE INVENTION

1. Field of the Invention

The present invention generally relates to an air-fuel ratio control apparatus for controlling the air-fuel ratio of an engine. More specifically, the present invention relates to an air-fuel ratio control apparatus that can reduce cracking of a sensor element of an air-fuel ratio sensor.

2. Background Information

Most vehicles are provided with an exhaust cleaning system that includes an underfloor catalytic converter. When the underfloor catalytic converter is disposed in the exhaust pathway under the floor or in a position set at a distance from the engine for cleaning exhaust that flows from the engine of a vehicle, time is required until activation occurs so as to obtain sufficient cleaning action. On the other hand, positioning the underfloor catalytic converter in the exhaust pathway in a position near the engine poses a problem in that durability is reduced due to thermal degradation.

Some vehicles are provided with an exhaust cleaning system that includes a main (underfloor) catalytic converter and a bypass catalytic converter. One example of this type of exhaust cleaning system is disclosed in Japanese Laid-Open Patent Application No. 5-321644. In this publication, the underfloor catalytic converter is disposed on the downstream side of a main channel of the exhaust channel, and the bypass catalytic converter is disposed in a bypass channel on the upstream side of the underfloor catalytic converter. A switching valve for switching the exhaust flow between the main channel and the bypass channel is disposed in the main channel on the upstream side from the underfloor catalytic converter. The exhaust thereby flows to the bypass channel until the underfloor catalytic converter is activated, and the exhaust is cleaned by the bypass catalytic converter that is activated early, whereby the exhaust cleaning efficiency of a vehicle can be improved.

In view of the above, it will be apparent to those skilled in the art from this disclosure that there exists a need for an improved air-fuel ratio control apparatus. This invention addresses this need in the art as well as other needs, which will become apparent to those skilled in the art from this disclosure.

SUMMARY OF THE INVENTION

It has been discovered that in the air-fuel ratio control apparatus described in Japanese Laid-Open Patent Application No. 5-321644, a portion of the exhaust (hereinafter referred to as "residual gas") from the engine remains in the main channel upstream of the switching valve when the switching valve is in a closed state. The residual gas dissipates heat through the switching valve and the like, and is therefore at a lower temperature than the exhaust immediately after being discharged from the engine. It is apparent that moisture in the residual gas condenses and is deposited on the switching valve when the residual gas is cooled in this manner by the switching valve. There is a problem in that when the moisture flows downstream when the switching valve is open and is deposited on the air-fuel ratio sensor accommodated downstream from the main channel, the air-fuel ratio sensor is rapidly cooled by the moisture, and cracks are generated in the sensor element of the air-fuel ratio sensor.

In view of the above, an object of the present invention is to provide an air-fuel ratio control apparatus that can reduce cracking of the sensor element of the air-fuel ratio sensor.

The above mentioned object can basically be attained by providing an air-fuel ratio control apparatus that basically comprises an exhaust system, a first sensor and a controller. The exhaust system includes an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to selectively open and close the exhaust channel to switch a pathway for exhaust gas from the exhaust channel to the bypass channel. The first sensor is arranged to detect a property indicative of an air-fuel ratio of exhaust flowing in the exhaust channel at a point downstream of the valve mechanism. The controller is configured to adjust an element temperature of the first sensor to a prescribed temperature or less during a prescribed interval of time from when the valve mechanism is switched from a closed state to an open state.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
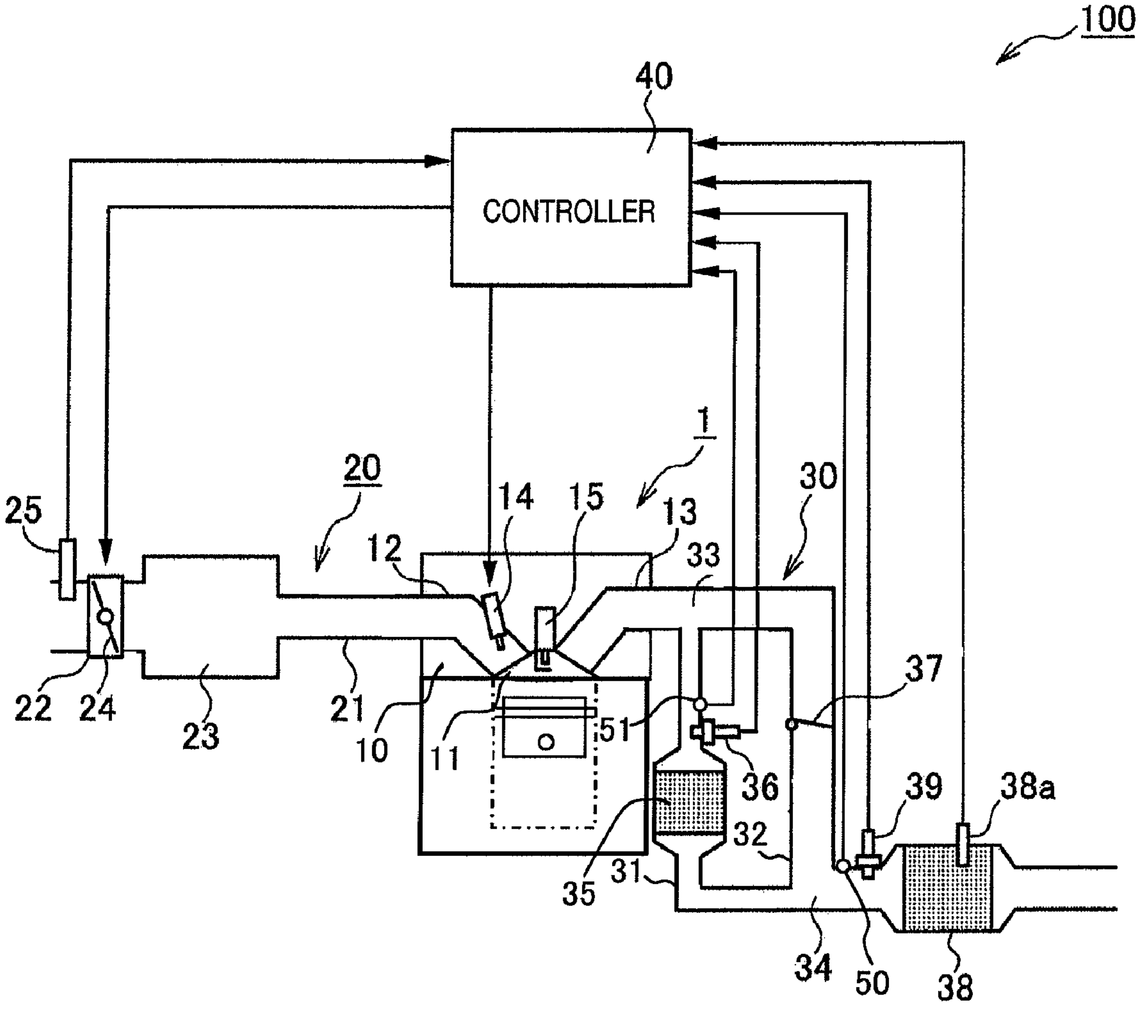
FIG. 1 is a simplified diagram of an air-fuel ratio control apparatus for controlling the air-fuel ratio of an engine in accordance with a first embodiment.

Referring initially to FIG. 1, an air-fuel ratio control apparatus 100 is a simplified diagram illustrating an air-fuel ratio control apparatus 100 in accordance with a first embodiment of the present invention. The air-fuel ratio control apparatus 100 basically includes an engine 1, an intake system 20, an exhaust system 30 and a controller 40. The air-fuel ratio control apparatus 100 controls the air-fuel ratio of the engine 1.

The engine 1 is a conventional internal combustion engine that is well known in the art. Since internal combustion engines are well known in the art, the structures of the engine 1 will not be discussed or illustrated in detail herein. Rather, only the control of the air-fuel ratio of the engine 1 is different. Thus, only those components of the engine 1 that are needed to understand the present invention will be discussed.

The engine 1 includes a cylinder head 10 with a plurality of combustion chambers 11 (only one shown), an intake port 12 for each cylinder and an exhaust port 13 for each cylinder. The intake port 12 is configured and arranged to taken in outside (intake) air and convey the intake air to a respective one of the combustion chambers 11. The exhaust port 13 is configured and arranged to convey exhaust from a respective one of the combustion chambers 11 of the engine 1.

Fuel is combusted in the combustion chambers 11 with the aid of a plurality of piston (only one depicted) slidably arranged in a cylinder block. A fuel injection valve 14 is disposed in the cylinder head 10 so as to protrude into the intake port 12 for each cylinder. The fuel injection valve 14 injects fuel into the intake port 12 in accordance with the vehicle operating state of the vehicle. An air-fuel mixture is formed by the fuel injected into the intake port 12 and the intake air taken in from the outside into the intake port 12.

A spark plug 15 is disposed in the cylinder head 10 on the top surface side of the combustion chamber 11 for each cylinder so as to protrude into the combustion chamber 11 for each cylinder. The spark plug 15 ignites the air-fuel mixture inside the combustion chamber 11 by discharging a spark with prescribed timing, and causing the air-fuel mixture to combust.

The intake system 20 includes an intake channel 21 of the intake system 20 that takes in fresh air from the outside. The intake channel 21 is fluidly connected to the intake port 12 formed in the cylinder head 10. The intake channel 21 is provided with a throttle chamber 22 and a collector tank 23 at a midway point.

The throttle chamber 22 is disposed on the upstream side of the intake channel 21. A throttle valve 24 is disposed in the throttle chamber 22 in order to control the intake rate of the intake air through the intake channel 21. The throttle valve 24 controls the intake rate by adjusting the position of the throttle in accordance with the vehicle operating state of the vehicle.

An airflow meter 25 is disposed in the intake channel 21 on an upper side of the throttle chamber 22. The airflow meter 25 detects the intake rate of fresh (intake) air taken in from the outside. A collector tank 23 is disposed in the intake channel 21 on the downstream side of the throttle valve 24. The collector tank 23 temporarily accumulates air that has flowed from upstream.

The exhaust system 30 includes a bypass channel 31 and a main exhaust channel 32. The main exhaust channel 32 of the exhaust system 30 is connected to the exhaust port 13 formed in the cylinder head 10. The main exhaust channel 32 conducts the exhaust gas discharged from the engine 1.

The bypass channel 31 is a channel having a smaller diameter than the main exhaust channel 32. The bypass channel 31 has an upstream end that branches from the main exhaust channel 32 at a branching section 33 and a downstream end that remerges with the main exhaust channel 32 at a merging section 34 downstream from the branching section. The bypass channel 31 is provided with a bypass catalytic converter 35 and an air-fuel ratio sensor 36 (hereinafter referred to as "second air-fuel ratio sensor"). The bypass catalytic converter 35 is disposed on an upstream side of the bypass channel 31 in proximity to the engine 1 so as to achieve early activation. The bypass catalytic converter 35 is a catalytic converter or the like having excellent low-temperature activity.

The main exhaust channel 32 includes a switching valve 37, a main catalytic converter 38, and an air-fuel ratio sensor 39 (hereinafter referred to as "first air-fuel ratio sensor"). The bypass catalytic converter 35 is a catalytic converter that has a smaller capacity than the main catalytic converter 38 (hereinafter referred to as "underfloor catalytic converter"). The underfloor catalytic converter 38 is disposed downstream from the merging section 34.

The second air-fuel ratio sensor 36 is disposed in the bypass channel 31 further upstream than the bypass catalytic converter 35. The second air-fuel ratio sensor 36 detects the oxygen concentration in the exhaust flowing into the bypass channel 31, and can obtain output proportional to the oxygen concentration. The sensor element of the second air-fuel ratio sensor 36 is warmed by a heater 51.

On the other hand, the main exhaust channel 32 is a channel having a greater diameter than that of the bypass channel 31, and the channel resistance that obstructs the flow of exhaust is therefore less than that of the bypass channel 31. The switching valve 37 is disposed in the main exhaust channel 32 between the branching section 33 and the merging section 34. The switching valve 37 opens and closes the main exhaust channel 32 in accordance with the vehicle operating condition of the vehicle. Thus, the switching valve 37 switches the exhaust channel for conveying the exhaust being discharged from the engine 1.

The underfloor catalytic converter 38 is disposed in the main exhaust channel 32 downstream from the merging section 34. The underfloor catalytic converter 38 is a three-way catalytic converter having a large capacity than does the bypass catalytic converter 35. The underfloor catalytic converter 38 cleans the exhaust that flows through the main exhaust channel 32. A catalyst temperature sensor 38*a* that detects the catalyst temperature is disposed in the underfloor catalyst 38.

The first air-fuel ratio sensor 39 is disposed in the main exhaust channel 32 on the upstream side of the underfloor catalytic converter 38. With the first air-fuel ratio sensor 39, the oxygen concentration in the exhaust flowing through the main exhaust channel 32 is detected in the same manner as with the second air-fuel ratio sensor 36 disposed in the bypass channel 31. The sensor element of the first air-fuel ratio sensor 39 is warmed by a heater 50.

The controller 40 preferably includes a microcomputer with an air-fuel ratio control program that controls the injection valve 14, the throttle valve 24 and the switching valve 37 as discussed below. The microcomputer of the controller 40 preferably includes other conventional components such as an input/output interface circuit, and storage devices such as a ROM (Read Only Memory) device and a RAM (Random Access Memory) device. The microcomputer of the controller 40 is programmed to control the operations of the injection valve 14, the throttle valve 24 and the switching valve 37 as discussed below. The memory circuit stores processing results and control programs for carrying out the operations of the air-fuel ratio control apparatus 100. It will be apparent to those skilled in the art from this disclosure that the precise structure and algorithms for the controller 40 can be any combination of hardware and software that will carry out the functions of the present invention.

The outputs of the airflow meter 25, the first and second air-fuel ratio sensors 36 and 39, and other sensors that detect the operating state of the vehicle are inputted to the controller 40. The controller 40 opens and closes the switching valve 37 based on the catalyst temperature of the underfloor catalytic converter 38 in the manner described below. Thus, the controller 40 switches the channel that conveys the exhaust discharged from the engine 1 to either the bypass channel 31 or the main exhaust channel 32. The controller 40 controls the applied voltage of the heater 50 based on the resistance value of the sensor elements of the second air-fuel ratio sensor 36 and the first air-fuel ratio sensor 39, and warms the sensor elements to a prescribed temperature. The controller 40 adjusts the position of the throttle valve 24 and the fuel injection rate of the fuel injection valve 14 based on the output values of the air-fuel ratio sensors 36 and 39, and controls the air-fuel ratio of the engine 1.

Figure 2A:
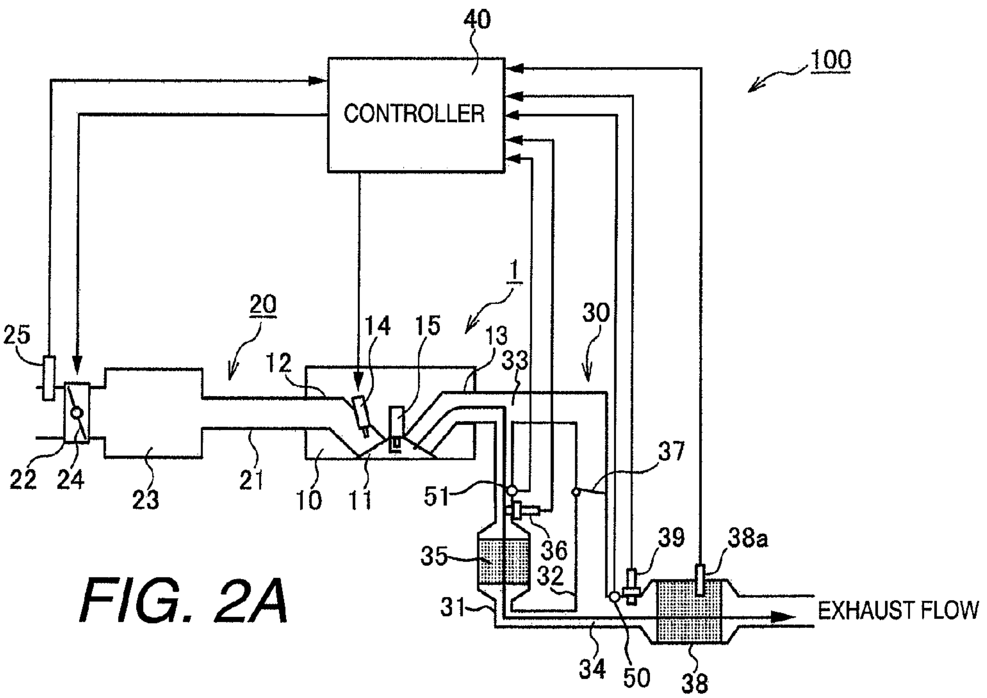
FIG. 2A is a simplified diagram of the air-fuel ratio control apparatus illustrated in FIG. 1, showing the flow of exhaust discharged from the combustion chamber of an engine when the switching valve is closed.
Figure 2B:
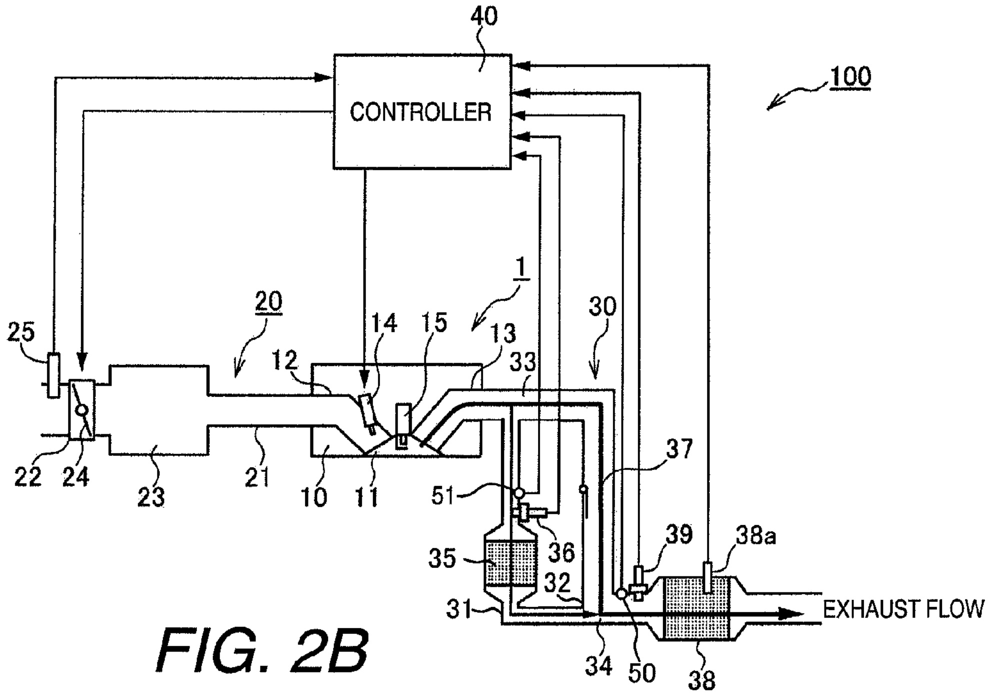
FIG. 2B is a simplified diagram of the air-fuel ratio control apparatus illustrated in FIGS. 1 and 2A, but showing the flow of exhaust discharged from the combustion chamber of an engine when the switching valve is closed.

FIGS. 2A and 2B are diagrams showing the flow of exhaust discharged from the engine 1. FIG. 2A shows the flow of exhaust when the switching valve 37 is in an open state. FIG. 2B shows the flow of exhaust when the switching valve 37 is in an open state. The flow of exhaust is indicated by arrows in the diagram, and the flow rate of the exhaust is indicated by the thickness of the line.

The switching valve 37 is closed and the main exhaust channel 32 is blocked off immediately after the engine 1 has been started up and at other times when the engine temperature and exhaust temperature are low, as shown in FIG. 2A. For this reason, all of the exhaust discharged from the engine 1 passes from the branching section 33 through the bypass channel 31 and is cleaned by the bypass catalytic converter 35. The bypass catalytic converter 35 is disposed in a position proximate to the engine 1, and is therefore rapidly activated and can clean the exhaust at an early stage. The exhaust cleaned by the bypass catalytic converter 35 flows to the downstream side of the bypass channel 31, flows from the merging section 34 into the main exhaust channel 32, and is released to the outside air after passing through the underfloor catalytic converter 38.

In this manner, during started up and times of low engine temperature and low exhaust temperature, the switching valve 37 is in a closed state such that the exhaust flows through the bypass channel 31. In this case, the second air-fuel ratio sensor 36 disposed in the bypass channel 31 detects the oxygen concentration of the exhaust that flows through the bypass channel 31. The controller 40 then adjusts the position of the throttle valve 24 and the fuel injection rate based on the detection value of the second air-fuel ratio sensor 36 and controls the air-fuel ratio in accordance with the engine operating state of the engine 1.

On the other hand, when the underfloor catalytic converter 38 is warmed and activated by exhaust from the engine 1 or when torque is demanded in response to the driver depressing the accelerator and the exhaust flow rate increases, then the switching valve 37 is opened in the manner shown in FIG. 2B. The controller 40 then adjusts the position of the throttle valve 24 and the fuel injection rate based on the detection value of the first air-fuel ratio sensor 39 and controls the air-fuel ratio in accordance with the engine operating state of the engine 1.

Most of the exhaust discharged from the engine 1 flows through the main exhaust channel 32 when the switching valve 37 is opened. A portion of the exhaust flows into the bypass channel 31 as well. However, since the bypass channel 31 has a smaller channel sectional area than the main exhaust channel 32, the exhaust flow rate through the bypass channel 31 is therefore less than that of the main exhaust channel 32. For this reason, thermal degradation of the bypass catalytic converter 35 that occurs when high-temperature exhaust passes through the bypass catalytic converter 35 is reduced. The exhaust that has flowed through the main exhaust channel 32 and the bypass channel 31 is cleaned by the underfloor catalytic converter 38 and is released to the outside air.

In this manner, the exhaust flow rate of the exhaust that flows through the main exhaust channel 32 is greater than that of the exhaust that flows through the bypass channel 31 when the switching valve 37 is open. The oxygen concentration in the exhaust can therefore be measured with good precision when the switching valve 37 is open by switching from the second air-fuel ratio sensor 36 disposed in the bypass channel 31 to the first air-fuel ratio sensor 39 disposed in the main exhaust channel 32. Adjustments can be made based on the detection value of the first air-fuel ratio sensor 39, so that the position of the throttle valve 24 and the fuel injection rate correspond to the engine operating state of the engine 1, and the air-fuel ratio is controlled in accordance with the engine operating state of the engine 1.

A portion of the exhaust from the engine 1 remains inside the main exhaust channel 32 in proximity to the switching valve 37 when the switching valve 37 is in a closed state. The remaining gas (residual gas) releases heat through the main exhaust channel 32 and the switching valve 37 during residence. Therefore, this remaining gas (residual gas) is at a lower temperature than the exhaust immediately after being discharged from the engine 1. When the residual gas is cooled by the switching valve 37 and other components, moisture in the residual gas condenses and is deposited on the switching valve 37 and other components. The moisture is flushed downstream when the switching valve 37 is opened. When the moisture is deposited on the first air-fuel ratio sensor 39, which has been warmed to the activation temperature, the first air-fuel ratio sensor 39 rapidly cools. There is a possible problem in that when the first air-fuel ratio sensor 39 is rapidly cooled in this manner, the sensor element of the first air-fuel ratio sensor 39 cracks and the oxygen concentration in the exhaust cannot be accurately detected. In view of this situation, the first air-fuel ratio sensor 39 is preferably disposed in a position in which the condensed moisture described above and other types of moisture are less liable to be deposited.

In view of this situation, in the first embodiment, the voltage applied to the heater 50 is limited when the switching valve 37 is closed, and the sensor element of the first air-fuel ratio sensor 39 is preheated to a prescribed temperature (e.g., 100° C.) that is lower than the activation temperature and at which the sensor element of the first air-fuel ratio sensor 39 will not crack. The switching valve 37 is opened, the voltage applied to the heater 50 is then increased, and the sensor element of the first air-fuel ratio sensor 39 is warmed to the activation temperature.

In the present embodiment, the sensor element of the first air-fuel ratio sensor 39 is preheated with the aid of the heater 50 to a prescribed temperature at which cracking does not occur. In another embodiment, the temperature can be set to be sufficiently lower than a prescribed temperature without the preheating with a heater when the switching valve 37 is closed (prior to the valve 37 being opened), and preheating with the aid of the heater 50 can be started after a prescribed length of time has elapsed after the valve 37 has been opened. It is apparent in this case as well that cracking of the sensor element of the first air-fuel ratio sensor 39 can be avoided.

In addition to the above, in the case that the sensor element of the first air-fuel ratio sensor 39 is preheated with the aid of the heater 50 to a prescribed temperature at which sensor cracking does not occur before the valve 37 is opened, the element temperature does not increase to a temperature at which the sensor element of the first air-fuel ratio sensor 39 will crack prior to the switching valve 37 being opened. The sensor element of the first air-fuel ratio sensor 39 can therefore be prevented from cracking, and since the sensor element of the first air-fuel ratio sensor 39 is heated to prescribed temperature at which cracking does not occur, the temperature difference between the temperature of the sensor element of the air-fuel ratio sensor after the switching valve has been opened and the sensor activation temperature can be reduced, and the sensor activation temperature can be reached more rapidly after the switching valve has been opened.

In the first embodiment, the sensor element of the first air-fuel ratio sensor 39 is warmed by controlling the voltage applied to the heater 50. Specifically, the heater temperature is increased by increasing the voltage applied to the heater 50, and the sensor element of the first air-fuel ratio sensor 39 is heated. The temperature of the sensor element is set based on the resistance value of the sensor element of the first air-fuel ratio sensor 39.

Figure 3:
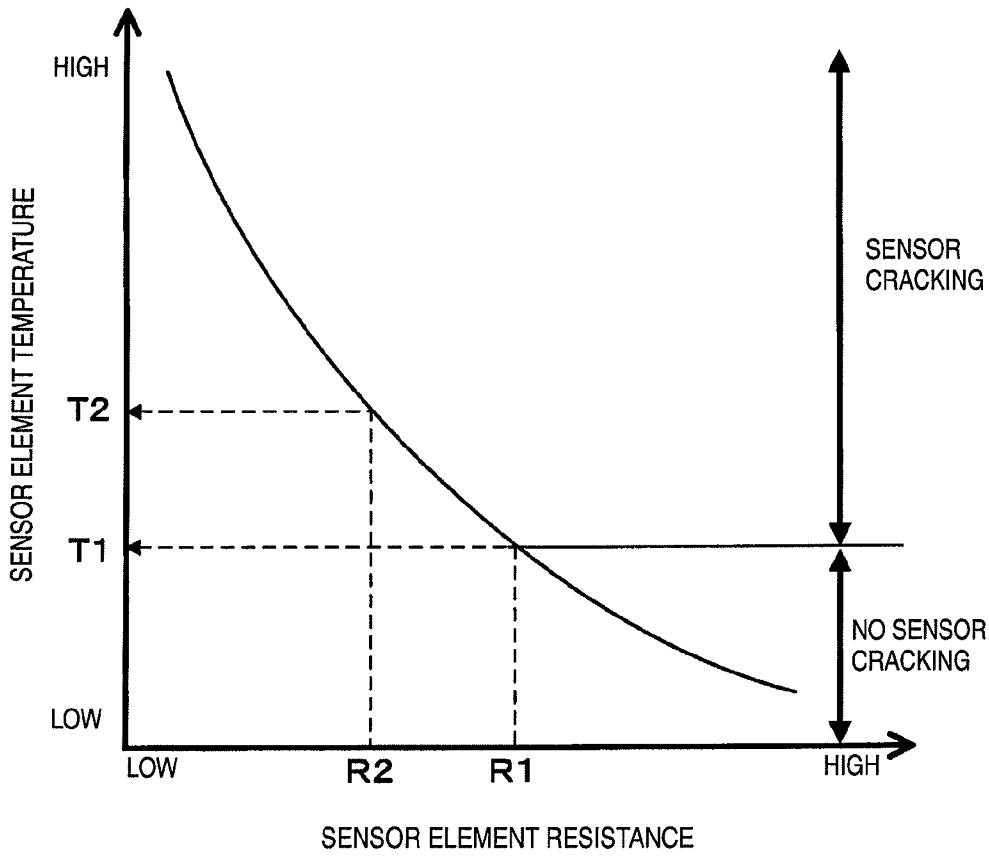
FIG. 3 is a diagram showing the relationship between the temperature of the sensor element of the air-fuel ratio sensor and the resistance value of the sensor element.

FIG. 3 is a diagram showing the characteristics relationship between the temperature of the sensor element of the first air-fuel ratio sensor 39 and the resistance value of the sensor element of the first air-fuel ratio sensor 39. The horizontal axis shows the resistance value of the sensor element of the first air-fuel ratio sensor 39, and the vertical axis shows the temperature of the sensor element of the first air-fuel ratio sensor 39. The resistance value of the sensor element of the first air-fuel ratio sensor 39 decreases as the temperature of the sensor element increases, as shown in FIG. 3.

In view of this situation, the voltage applied to the heater 50 is adjusted so that that the resistance value of the sensor element of the first air-fuel ratio sensor 39 is R1 when the switching valve 37 is closed, and the sensor element of the first air-fuel ratio sensor 39 is set to a temperature T1 (a prescribed temperature of about 50° C. to 150° C., set in accordance with the sensor) at which the sensor element of the first air-fuel ratio sensor 39 will not crack when moisture is deposited.

Next, the switching valve 37 is opened, moisture flows downstream and passes by the first air-fuel ratio sensor 39, the voltage applied to the heater 50 (first warming device) is then increased so that the resistance value of the sensor element of the first air-fuel ratio sensor 39 becomes R2, and the temperature is adjusted so as to arrive at the sensor element temperature T2 (which differs according to the sensor, but is a temperature of about 200° C., for example) at which the first air-fuel ratio sensor 39 becomes active.

Since the first air-fuel ratio sensor 39 is warmed sufficiently so that the sensor element of the first air-fuel ratio sensor 39 does not crack when the moisture deposited on the switching valve 37 at valve closure flows downstream at valve opening, the sensor element of the first air-fuel ratio sensor 39 can be kept from cracking.

Here, the determination as to whether the moisture has passed by the first air-fuel ratio sensor 39 is made based on a map that shows the preset relationship between the moisture passage time and the water temperature when the engine 1 is started up.

Figure 4:
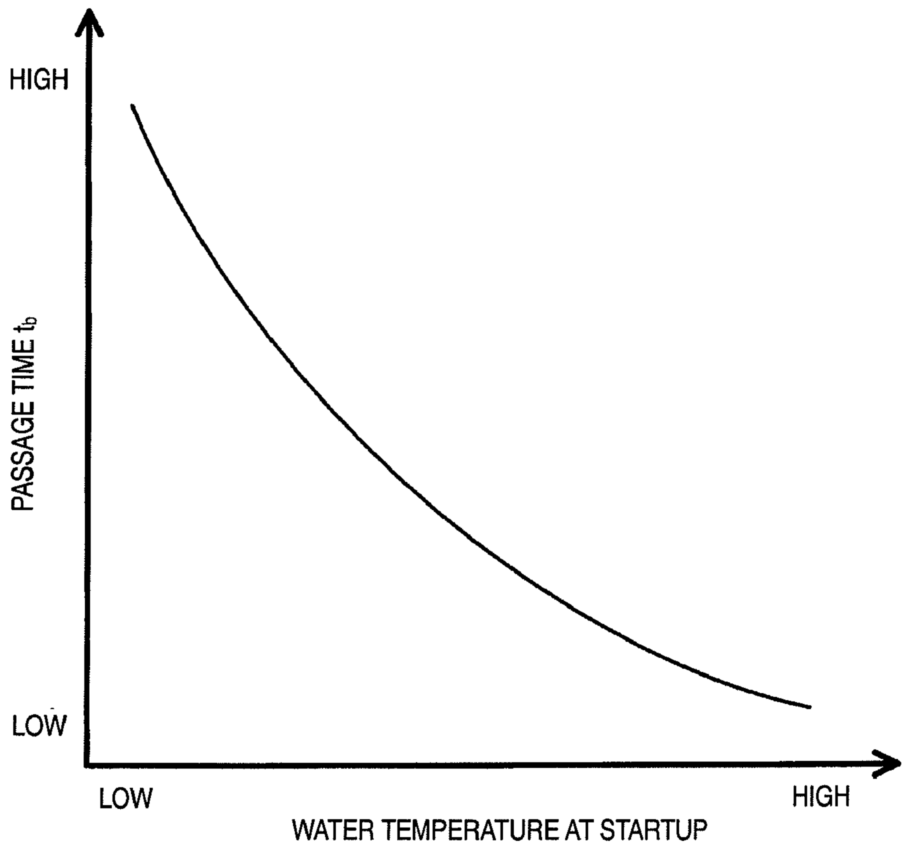
FIG. 4 is a diagram showing the relationship between the moisture passage time and the water temperature during engine start up.

FIG. 4 is a diagram showing the relationship between the moisture passage time and the water temperature when the engine 1 is started up. The horizontal axis shows the temperature of the coolant when the engine 1 is started up. The vertical axis shows the time during which moisture passes by the first air-fuel ratio sensor 39. The passage time is set to be shorter as the water temperature at startup increases, as shown in FIG. 4. In other words, when the engine 1 is cold or the water temperature is low at engine startup, the temperature of the switching valve 37 is low and the residual gas is easily cooled. Therefore, the amount of moisture deposited on the switching valve 37 increases. For this reason, the moisture passage time is set to be longer when the switching valve 37 is open in cases in which the temperature of the water at startup is low.

In contrast, when the water temperature is high at engine startup, the residual gas is cooled by the switching valve 37 only moderately, and less moisture is therefore deposited on the switching valve 37. Consequently, the time during which the moisture passes by the first air-fuel ratio sensor 39 is set to be shorter than when the water temperature is low at startup.

Here, the control details of the air-fuel ratio control apparatus 100 of the first embodiment carried out by the controller 40 will be described with reference to FIG. 5.

Figure 5:
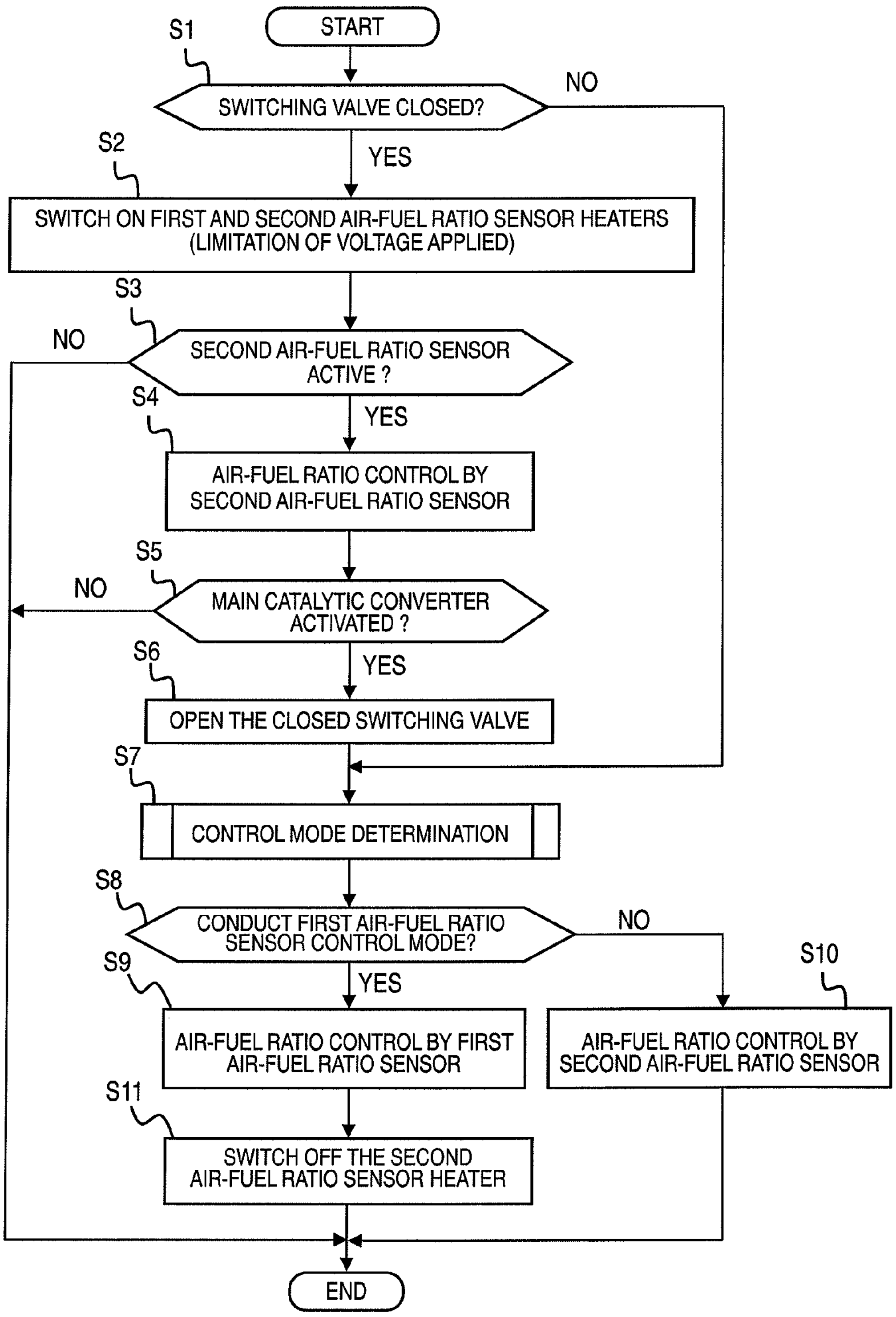
FIG. 5 is a flowchart showing the processing steps executed by the air-fuel ratio control apparatus in accordance with the first embodiment.

FIG. 5 is a flowchart showing the control routine of the air-fuel ratio control apparatus 100 of the first embodiment. The control is started at the startup of the engine 1 and is carried out at fixed cycles, e.g., 10-ms cycles, until the air-fuel ratio control is started using the first air-fuel ratio sensor 39.

In step S1, the controller 40 determines whether the switching valve 37 has opened the main exhaust channel 32. Here, the process advances to step S2 in the case that the switching valve 37 is in a closed state, and the process advances to step S7 in the case that the switching valve 37 is in an open state.

In step S2, the controller 40 applies voltage to the heaters 50 and 51 that warm the sensor elements of the air-fuel ratio sensors 36 and 39. The sensor element of the second air-fuel ratio sensor 36 is warmed to the activation temperature. The voltage to the heater 50 is limited and the sensor element of the first air-fuel ratio sensor 39 is warmed to a temperature (e.g., 100° C.) at which the sensor element does not crack when the switching valve 37 is opened and moisture is deposited on the first air-fuel ratio sensor 39.

In step S3, the controller 40 determines whether the second air-fuel ratio sensor 36 is active. The activation determination is made based on the sensor element temperature of the air-fuel ratio sensor 36. When the controller 40 determines that the second air-fuel ratio sensor 36 has been active, the process advances to step S4. When it has been determined that the second air-fuel ratio sensor 36 has is inactive, the current process is ended.

In step S4, the controller 40 controls the air-fuel ratio of the engine 1 based on the detection value of the second air-fuel ratio sensor 36. The step S4 constitutes a second air-fuel ratio control section. Specifically, the exhaust from the combustion chamber 11 flows through the bypass channel 31 when the switching valve 37 is closed. Therefore, in step S4, the second air-fuel ratio sensor 36 disposed in the bypass channel 31 detects the oxygen concentration of the exhaust that flows through the bypass channel 31, and brings oxygen concentration to the air-fuel ratio that corresponds to the operating state of the engine 1 based on the detection value.

In step S5, the controller 40 determines whether the underfloor catalyst 38 is activated based on catalyst temperature detected by the catalyst temperature sensor 38*a*.

The exhaust that has flowed through the bypass channel 31 is cleaned by the bypass catalytic converter 35 and is admitted into the main exhaust channel 32 at the merging section 34. The exhaust that has flowed into the main channel passes through the underfloor catalyst 38 disposed downstream of the main exhaust channel 32, and the underfloor catalyst 38 is therefore gradually warmed to the catalyst activation temperature. Here, the process advances to step S6 when the underfloor catalyst 38 has reached the activation temperature, and the current process is ended when the underfloor catalyst 38 has not reached the activation temperature. When the underfloor catalyst 38 is activated, the controller 40 opens the switching valve 37 from a closed state in step S6, and the channel through which the exhaust flows is switched.

The switching valve 37 can be opened when the driver depresses the accelerator to demand torque and to cause the exhaust rate to increase before the underfloor catalyst 38 has been determined to be activated.

In step S7, the controller 40 determines whether the control mode is the second air-fuel ratio sensor control mode for controlling the air-fuel ratio of the engine 1 with the aid of the second air-fuel ratio sensor 36, or the first air-fuel ratio sensor control mode for controlling the air-fuel ratio of the engine 1 with the aid of the first air-fuel ratio sensor 39.

In step S8, the controller 40 determines whether the control mode is in the first air-fuel ratio sensor control mode. Here, the process advances to step S10 when the control mode is the second air-fuel ratio sensor control mode. In step S10, the controller 40 controls the air-fuel ratio of the engine 1 based on the detection value of the second air-fuel ratio sensor 36, and the process is ended. On the other hand, the process advances to step S9 when the control mode is the first air-fuel ratio sensor control mode.

In step S9, the controller 40 makes adjustments to the position of the throttle valve and the fuel injection rate based on the detection value of the first air-fuel ratio sensor 39, and controls the air-fuel ratio in accordance with the operating state of the engine 1. The step S9 constitutes a first air-fuel ratio control section. The process then advances to step S11.

After the air-fuel ratio control of the engine 1 has been started with the aid of the first air-fuel ratio sensor 39, the heater 51 of the second air-fuel ratio sensor 36 is switched off in step S11, and the process is ended.

Figure 6:
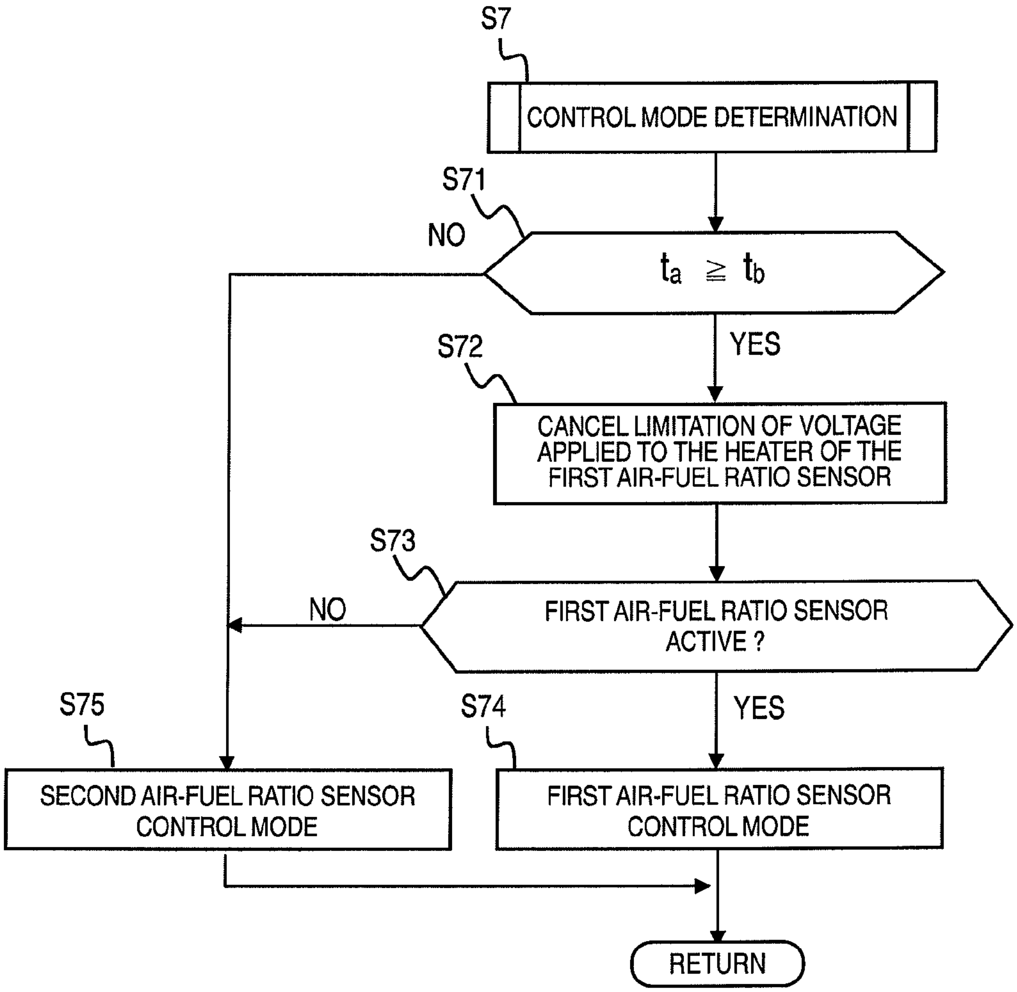
FIG. 6 is a flowchart showing the processing steps executed by the air-fuel ratio control apparatus when conducting control mode determination in accordance with the first embodiment.

Next, the control mode determination will be described with reference to FIG. 6. FIG. 6 is a flowchart showing the control routine of the control mode determination in step S7. The step S7 constitutes a control mode switching section.

First, in step S71, the moisture that is deposited on the switching valve 37 when the switching valve 37 is closed is flushed downstream when the switching valve 37 is open, and then the controller 40 determines whether the moisture has passed by the first air-fuel ratio sensor 39. This determination is made based on whether a time $t_a$ after the switching valve 37 has opened has exceeded the passage time $t_b$, which is a prescribed reference value. The reference passage time $t_b$ is set based on the "passage time/water temperature at startup" characteristic obtained empirically or otherwise in advance, as shown in FIG. 4. (For example, in the case that the water temperature is 10° C. when an engine having a displacement of 2,000 cc is started up, the time is about 0.3 to 0.5 seconds.) When $t_a \geqq t_b$, it is determined that the moisture has passed by the first air-fuel ratio sensor 39, and the process advances to step S72. When $t_a < t_b$, it is determined that moisture remains upstream from the first air-fuel ratio sensor 39, and the process advances to step S75. Thus, the prescribed reference value (prescribed time) changes with changes in the current water temperature.

When $t_a \geqq t_b$ in step S72, the controller 40 removes the limitation on the voltage applied to the heater 50 that warms the sensor element of the first air-fuel ratio sensor 39. Specifically, the voltage applied to the heater 50 is increased and the first air-fuel ratio sensor 39 is warmed to the activation temperature.

In step S73, the controller 40 determines whether the first air-fuel ratio sensor 39 is active. The step S73 constitutes an activity determination section. The activity of the first air-fuel ratio sensor 39 is determined based on the temperature of the sensor element. The process advances to step S73 when the first air-fuel ratio sensor 39 is active. The process advances to step S74 when the first air-fuel ratio sensor 39 is active, and advances to S75 when the first air-fuel ratio sensor 39 is not active.

In step S74, the controller 40 sets the second air-fuel ratio control mode that controls the air-fuel ratio of the engine 1 based on the detection value of the first air-fuel ratio sensor 39.

In step S75, the controller 40 sets the first air-fuel ratio control mode that controls the air-fuel ratio of the engine 1 based on the detection value of the second air-fuel ratio sensor 36.

The process advances to step S8 shown in FIG. 5 after the control mode has been determined in steps S71 to S75 as discussed above.

Figure 7:
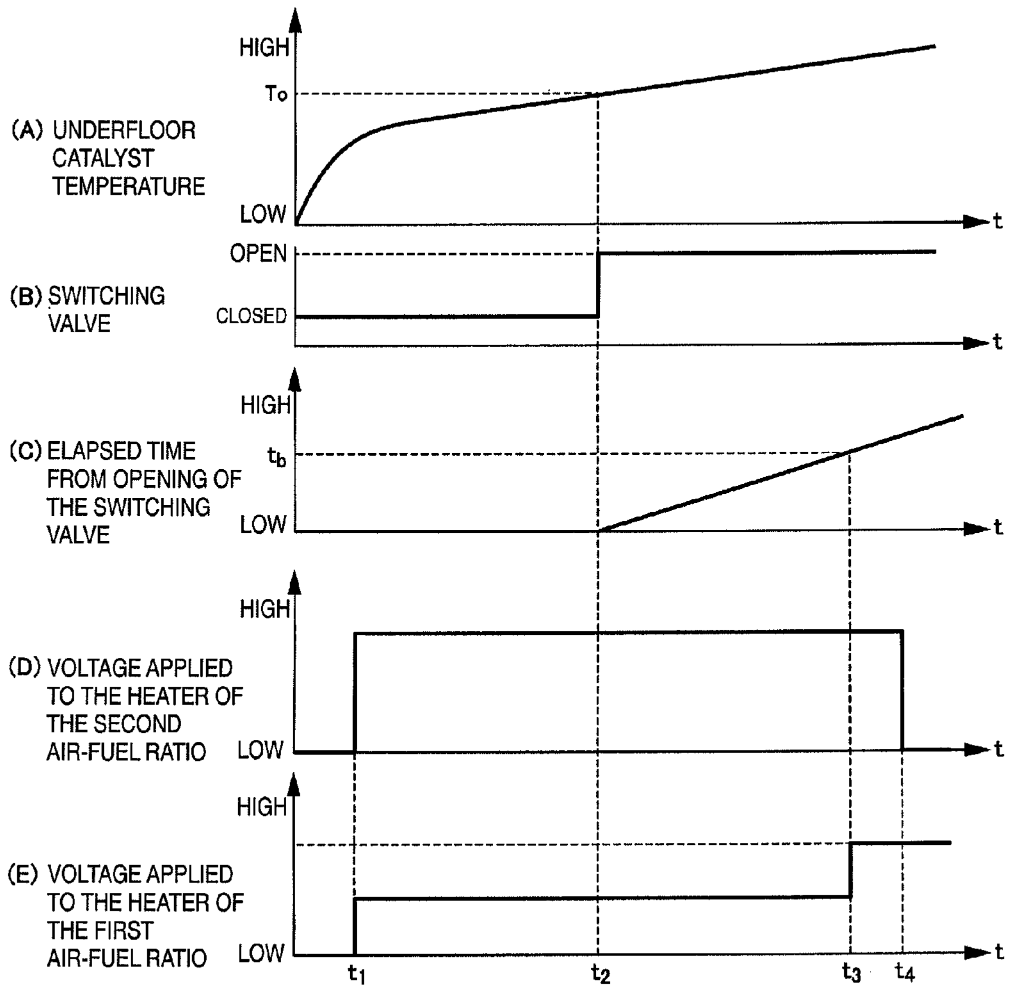
FIG. 7 is a timing chart showing the operation of the air-fuel ratio control apparatus of the first embodiment.

FIG. 7 is a timing chart showing the operation of the air-fuel ratio control apparatus 100 of the first embodiment.

After the engine 1 has started up, voltage is applied to the heaters 51 and 50 that warm the sensor elements of the air-fuel ratio sensors 36 and 39 at time $t_1$ (see, parts (D) and (E) of FIG. 7). The sensor element of the second air-fuel ratio sensor 36 is warmed to an activation temperature. The voltage applied to the heaters is limited (part (E) of FIG. 7) and the sensor element of the first air-fuel ratio sensor 39 is warmed to a temperature at which the sensor element does not crack when moisture is deposited. When the underfloor catalyst 38 accommodated in the main exhaust channel 32 warms to the activation temperature $T_0$ (part (A) of FIG. 7), the switching valve 37 opens (part (B) of FIG. 7) at time $t_2$ and the exhaust channel is switched.

When the switching valve 37 opens, the moisture deposited on the switching valve 37 flows toward the first air-fuel ratio sensor 39 disposed downstream of the main exhaust channel 32. Here, the voltage applied to the heater 50 that warms the sensor element of the first air-fuel ratio sensor 39 is increased at time $t_3$ at which the passage time $t_b$ has elapsed since the switching valve 37 opened, and the sensor element of the first air-fuel ratio sensor 39 is warmed to the activation temperature (part (E) of FIG. 7). In this manner, element cracking of the first air-fuel ratio sensor 39 can be inhibited by waiting for moisture to reach and warming the first air-fuel ratio sensor 39 after the switching valve 37 has been opened.

After it has been confirmed that the first air-fuel ratio sensor 39 has reached the activation temperature, the application of voltage to the heater 51 of the second air-fuel ratio sensor 36 is stopped (part (D) of FIG. 7) at time $t_4$, a switch is made from the second air-fuel ratio sensor 36 to the first air-fuel ratio sensor 39, and the air-fuel ratio of the engine 1 is controlled based on the detection value of the first air-fuel ratio sensor 39.

In accordance with the above, the air-fuel ratio control apparatus 100 of the first embodiment can obtain the following effects.

In the determining the control mode according to the first embodiment, a determination is made in step S71 as to whether a prescribed passage time $t_b$ has elapsed since the switching valve 37 has opened, and after the moisture remaining upstream of the first air-fuel ratio sensor 39 has passed by the first air-fuel ratio sensor 39, the sensor element of the first air-fuel ratio sensor 39 is heated to the activation temperature. Therefore, it is possible to reduce the moisture-induced rapid cooling of the first air-fuel ratio sensor 39 and cracking of the sensor element of the first air-fuel ratio sensor 39.

The first air-fuel ratio sensor 39 is warmed from a temperature at which the sensor element will not crack to the activation temperature after the switching valve 37 is opened. Therefore, the first air-fuel ratio sensor 39 can be active at an early stage.

In step S73 of the control mode determination, a determination is made as to whether the first air-fuel ratio sensor 39 is active, and when the first air-fuel ratio sensor 39 is active, a switch is made from the second air-fuel ratio sensor 36 to the first air-fuel ratio sensor 39. Therefore, the air-fuel ratio of the engine 1 can be accurately controlled based on the detection value of the first air-fuel ratio sensor 39, which is in an active state.

Second Embodiment

A second embodiment of the air-fuel ratio control apparatus 100 will be described with reference to FIGS. 8 and 9. The basic configuration of the second embodiment is the same as that of the first embodiment, but the configuration of the control mode determination of the controller 40 is different. Specifically, the configuration is provided with a failsafe function in which the air-fuel ratio sensor is forcibly switched when the vehicle is in a prescribed operating state. Thus, the following description will mainly focus on this point of difference from the first embodiment.

Figure 8:
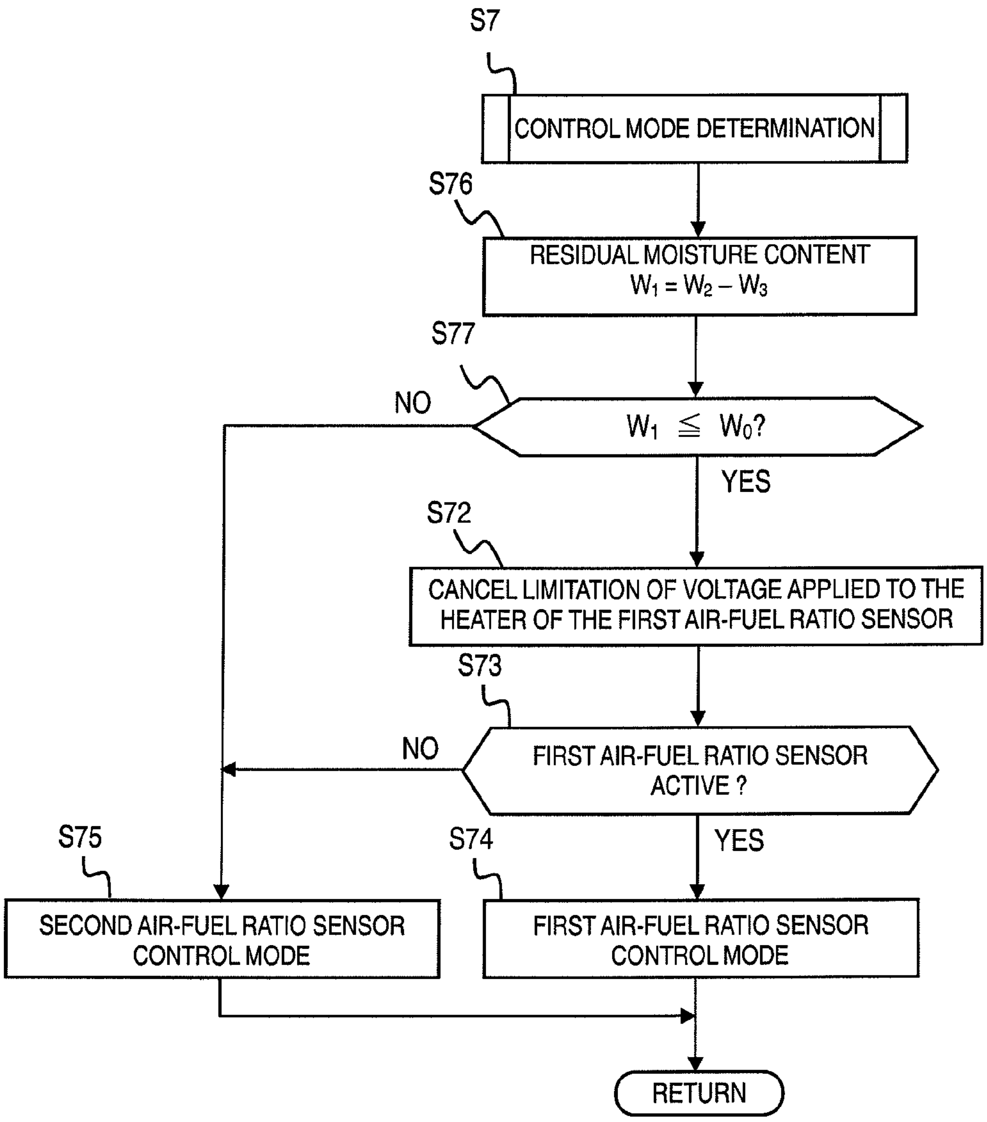
FIG. 8 is a flowchart showing the processing steps executed by the air-fuel ratio control apparatus when conducting control mode determination in accordance with a second embodiment.

FIG. 8 is a flowchart that shows the control routine for determining the control mode in the second embodiment. The control of steps S72 to S75 is the same as in the first embodiment, and a description thereof is omitted for the sake of convenience.

FIG. 8 is a flowchart showing the control routine of the control mode determination in the second embodiment. The control processes of steps S72 to S75 are the same as in the first embodiment, and thus, descriptions of these steps will not be repeated for the sake of brevity.

In steps S76 and S77, the controller 40 determines the warming of the first air-fuel ratio sensor 39.

First, in the step S76, the controller 40 calculates the moisture content $W_1$ remaining upstream of the first air-fuel ratio sensor 39 after the switching valve 37 has been opened. The calculation is made using formula (1) based on the moisture content $W_2$ that is generated when the switching valve 37 is closed and the moisture content $W_3$ that evaporates when the switching valve 37 is open.

Here, the moisture content $W_1$ gradually changes with the passage of time because some of the moisture deposited on the switching valve 37 is evaporated by the high-temperature exhaust discharged from the engine 1, and some is flushed downstream.

$$W_1 = W_2 - W_3 \quad (1)$$

Where: $W_1$: Moisture content remaining upstream of the first air-fuel ratio sensor 39;

$W_2$: Moisture content generated when the switching valve 37 is closed; and $W_3$: Evaporated moisture content when the switching valve 37 is open.

The moisture content $W_2$ that is generated when the switching valve 37 is closed is estimated from the intake humidity detected by a humidity sensor disposed in the upstream of the intake channel 21, and from the temperature of the switching valve 37, which is estimated from the water temperature at engine 1 startup and the engine load and speed. The evaporated moisture content $W_3$ produced when the switching valve 37 is open is estimated from the rate at which the exhaust flows through the main exhaust channel 32 when the switching valve 37 is opened, and the amount of heat that the exhaust transmits to the moisture.

In step S76, the controller 40 determines whether the moisture content $W_1$ is at or below a prescribed value $W_0$, which is established in accordance with the operating state of the vehicle. Specifically, a determination is made at to whether the moisture remaining upstream of the first air-fuel ratio sensor 39 has decreased to a level at which the sensor element of the first air-fuel ratio sensor 39 does not rapidly cool.

When $W_1 \leqq W_0$, it is determined that the water content $W_1$ has sufficiently decreased, the process then advances to step S72, and the voltage applied to the heater 50 is increased to warm the sensor element of the first air-fuel ratio sensor 39 to the activation temperature. The process thereafter is the same as that of the first embodiment. Conversely, when $W_1 > W_0$, it is determined that the moisture content has not sufficiently decreased, and if the situation is left unchanged, the element of the first air-fuel ratio sensor 39 will crack when a switch is made from the second air-fuel ratio sensor 36 to the first air-fuel ratio sensor 39. The process then advances to step S75 and the control mode is set in the second air-fuel ratio sensor control mode.

Figure 9:
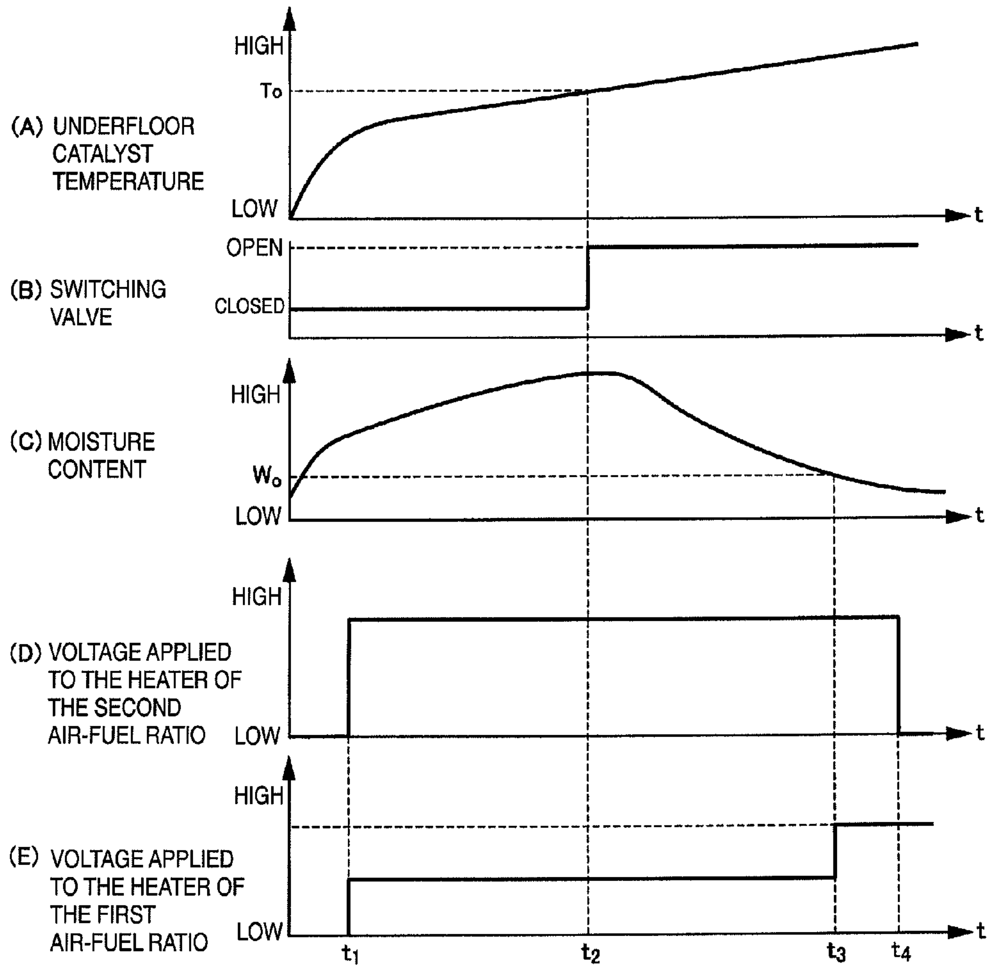
FIG. 9 is a timing chart showing the operation of the air-fuel ratio control apparatus of the second embodiment.

FIG. 9 is a timing chart showing the operation of the air-fuel ratio control apparatus 100 of the second embodiment.

After the engine 1 has started up, voltage is applied to the heaters that warm the sensor elements of the air-fuel ratio sensors 36 and 39 at time $t_1$ (parts (D) and (E) of FIG. 9). The sensor element of the second air-fuel ratio sensor 36 is warmed to an activation temperature. The voltage applied to the heaters is limited (part (E) of FIG. 9) and the sensor element of the first air-fuel ratio sensor 39 is warmed to a temperature at which the sensor element does not crack when moisture is deposited. When the underfloor catalyst 38 accommodated in the main exhaust channel 32 warms to the activation temperature $T_0$ (part (A) of FIG. 9), the switching valve 37 opens (part (B) of FIG. 9) at time $t_2$.

When the switching valve 37 opens, the moisture deposited on the switching valve 37 flows toward the first air-fuel ratio sensor 39 disposed downstream of the main exhaust channel 32. Here, in the second embodiment, the moisture content $W_1$ remaining upstream of the first air-fuel ratio sensor 39 is estimated. After the moisture content $W_1$ has become less than a prescribed value $W_0$ (part (C) of FIG. 9), the sensor element of the first air-fuel ratio sensor 39 is warmed to the activation temperature at time $t_3$. Cracking of the element of the first air-fuel ratio sensor 39 can thereby be reduced.

After it has been confirmed that the first air-fuel ratio sensor 39 has reached the activation temperature, the application of voltage to the heater 51 of the second air-fuel ratio sensor 36 is stopped (part (D) of FIG. 9) at time $t_4$, a switch is made from the second air-fuel ratio sensor 36 to the first air-fuel ratio sensor 39, and the air-fuel ratio of the engine 1 is controlled based on the detection value of the first air-fuel ratio sensor 39.

In accordance with the above, the air-fuel ratio control apparatus 100 of the second embodiment can obtain the following effects.

In determining the control mode according to the second embodiment, when the switching valve 37 has been opened and the moisture content $W_1$ remaining upstream of the first air-fuel ratio sensor 39 has thereafter become less than a prescribed value $W_0$, the voltage applied to the heater 50 is adjusted so that the first air-fuel ratio sensor 39 reaches the activation temperature. In this manner, the sensor element of the first air-fuel ratio sensor 39 is warmed after the moisture content $W_1$ remaining upstream of the first air-fuel ratio sensor 39 has sufficiently decreased, and cracking of the sensor element of the first air-fuel ratio sensor 39 can therefore be more reliably reduced.

In the first embodiment and second embodiment, the air-fuel ratio sensors 36 and 39 can be replaced with oxygen sensors such that the oxygen concentration in the exhaust can be detected by the oxygen sensors rather than by the air-fuel ratio sensors 36 and 39. Thus, the air-fuel ratio of the engine 1 can be controlled based on the detection values of the oxygen sensors.

Also, voltage can be applied to the heaters 50 and 51 after the switching valve 37 has been opened rather than applying voltage to the heaters when the switching valve 37 is closed, so as to warm the sensor element of the first air-fuel ratio sensor 39 to an activation temperature.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An air-fuel ratio control apparatus comprising:

an exhaust system including an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to selectively open and close the exhaust channel to switch a pathway for exhaust gas from the exhaust channel to the bypass channel;

a first sensor arranged to detect a property indicative of an air-fuel ratio of exhaust flowing in the exhaust channel at a point downstream of the valve mechanism; and a controller configured to adjust an element temperature of the first sensor to a prescribed temperature or less during a prescribed interval of time from when the valve mechanism is switched from a closed state to an open state.

2. The air-fuel ratio control apparatus as recited in claim 1, wherein the controller is further configured such that the prescribed temperature is a temperature that is less than an activity temperature of the first sensor, and is an upper temperature limit at which a first air-fuel ratio element can be prevented from cracking.

3. The air-fuel ratio control apparatus as recited in claim 2, further comprising a first warming device arranged to warm the first sensor, with the controller including a preheating section controls the first warming device to preheat the first sensor to the prescribed temperature while the valve mechanism is closed immediately prior to the valve mechanism being switched from the closed state to the open state.

4. The air-fuel ratio control apparatus as recited in claim 1, further comprising a second sensor arranged to detect a property indicative of an air-fuel ratio of exhaust flowing in the bypass channel, with the controller including a first air-fuel ratio control section configured to control an engine air-fuel ratio based on an output of the first sensor when the valve mechanism is in the open state, and a second air-fuel ratio control section configured to control the engine air-fuel ratio based on an output of the second sensor when the valve mechanism is in the closed state, the controller being configured such that an amount of heat supplied to the first sensor is increased and control is switched from the second air-fuel ratio control section to the first air-fuel ratio control section after the prescribed interval of time when the valve mechanism is switched from the closed state to the open state.

5. The air-fuel ratio control apparatus as recited in claim 1, wherein the controller includes an activity determination section configured to determine an activity state of the first sensor after the valve mechanism is switched from the closed state to the open state and after the prescribed interval of time has elapsed, and the controller being further configured such that an amount of heat supplied to the first sensor is increased after the prescribed interval of time has elapsed when the valve mechanism is switched from the closed state to the open state, and such that control is switched from the second air-fuel ratio control section to the first air-fuel ratio control section when the first sensor has been determined by the activity determination section to be active.

6. The air-fuel ratio control apparatus as recited in claim 1, wherein the controller is further configured such that the prescribed interval of time is established based on a time required for exhaust gas remaining in an exhaust channel portion extending from the branching section to the valve mechanism when the valve mechanism is closed to pass by the first sensor after the valve mechanism is opened.

7. The air-fuel ratio control apparatus as recited in claim 1, wherein the controller is further configured such that the prescribed interval of time is established based on a time required for condensed moisture generated in an exhaust channel portion extending from the branching section to the valve mechanism when the valve mechanism is closed to reach by the first sensor after the valve mechanism is opened.

8. The air-fuel ratio control apparatus as recited in claim 1, wherein the controller is further configured such that the prescribed interval of time is established based on an engine coolant temperature during engine start up.

9. The air-fuel ratio control apparatus as recited in claim 1, wherein the controller is further configured such that the prescribed interval of time is a time until a moisture content of moisture remaining in exhaust upstream of the first sensor reaches a prescribed value or less after the valve mechanism has been opened.

10. The air-fuel ratio control apparatus as recited in claim 9, wherein the controller is further configured such that the prescribed value is established based on a vehicle operating state.

11. An air-fuel ratio control method for an exhaust system including an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to selectively open and close the exhaust channel to switch a pathway for exhaust gas from the exhaust channel to the bypass channel, the method comprising:

detecting a property indicative of an air-fuel ratio of exhaust flowing in the exhaust channel at a point downstream of the valve mechanism using a first sensor;

adjusting an element temperature of the first sensor to a prescribed temperature or less during a prescribed interval of time from when the valve mechanism is switched from a closed state to an open state.

12. The air-fuel ratio control method as recited in claim 11, further comprising establishing the prescribed temperature as a temperature that is less than an activity temperature of the first sensor, and as an upper temperature limit at which a first air-fuel ratio element can be prevented from cracking.

13. The air-fuel ratio control method as recited in claim 12, wherein the adjusting of the element temperature of the first sensor is performed by preheating the first sensor to the prescribed temperature while the valve mechanism is closed immediately prior to the valve mechanism being switched from a closed state to an open state.

14. The air-fuel ratio control method as recited in claim 11, further comprising detecting a property indicative of an air-fuel ratio of exhaust flowing in the bypass channel using a second sensor;

controlling an engine air-fuel ratio based on an output of the first sensor when the valve mechanism is in the open state; and controlling the engine air-fuel ratio based on an output of the second sensor when the valve mechanism is in the closed state, with the adjusting of the element temperature of the first sensor being performed such that an amount of heat supplied to the first sensor is increased and control is switched from control based on the second sensor to control based on the first sensor after the prescribed interval of time when the valve mechanism is switched from the closed state to the open state.

15. The air-fuel ratio control method as recited in claim 11, further comprising determining an activity state of the first sensor after the valve mechanism is switched from the closed state to the open state and after the prescribed interval of time has elapsed, with the adjusting of the element temperature of the first sensor being performed such that an amount of heat supplied to the first sensor is increased after the prescribed interval of time has elapsed when the valve mechanism is switched from the closed state to the open state, and such that control based on the second sensor to control based on the first sensor when the first sensor has been determined by the activity determination section to be active.

16. The air-fuel ratio control method as recited in claim 11, further comprising establishing the prescribed interval of time based on a time required for exhaust gas remaining in an exhaust channel portion extending from the branching section to the valve mechanism when the valve mechanism is closed to pass by the first sensor after the valve mechanism is opened.

17. The air-fuel ratio control method as recited in claim 11, wherein establishing the prescribed interval of time based on a time required for condensed moisture generated in an exhaust channel portion extending from the branching section to the valve mechanism when the valve mechanism is closed to reach by the first sensor after the valve mechanism is opened.

18. The air-fuel ratio control method as recited in claim 11, wherein establishing the prescribed interval of time based on an engine coolant temperature during engine start up.

19. The air-fuel ratio control method as recited in claim 11, wherein establishing the prescribed interval of time as a time until a moisture content of moisture remaining in exhaust upstream of the first sensor reaches a prescribed value or less after the valve mechanism has been opened.

20. The air-fuel ratio control method as recited in claim 19, wherein establishing the prescribed value based on a vehicle operating state.

* * * * *